J. F. GAIL.
CASTER SOCKET.
APPLICATION FILED DEC. 27, 1920.
1,424,466. Patented Aug. 1, 1922.
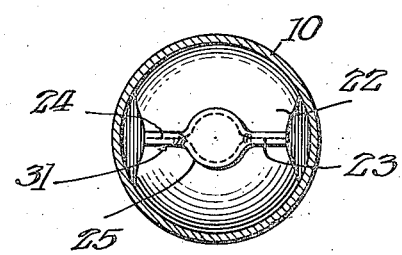
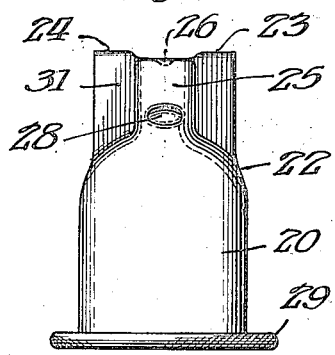
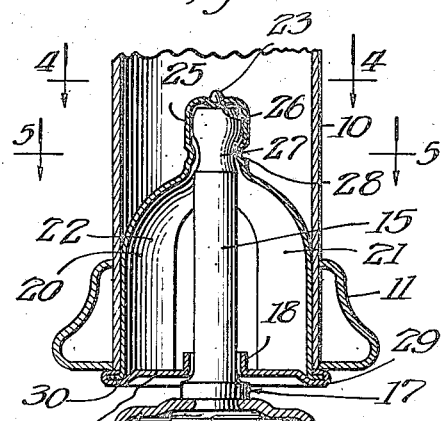
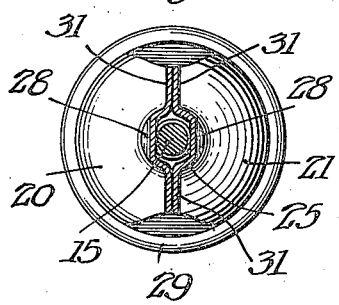
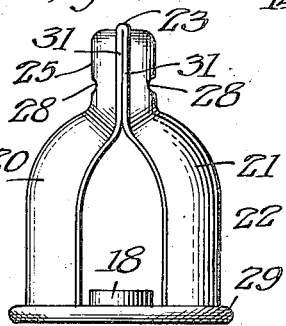
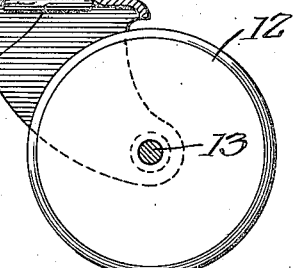
Inventor:
John F. Gail,
By Fisher Towle Clapp + Soans
Attys

UNITED STATES PATENT OFFICE.

JOHN F. GAIL, OF EVANSTON, ILLINOIS, ASSIGNOR TO SIMMONS COMPANY, OF KENOSHA, WISCONSIN, A CORPORATION OF DELAWARE.

CASTER SOCKET.

1,424,466. Specification of Letters Patent. Patented Aug. 1, 1922.

Application filed December 27, 1920. Serial No. 433,137.

*To all whom it may concern:*

Be it known that I, JOHN F. GAIL, a citizen of the United States, residing at Evanston, in the county of Cook and State of Illinois, have invented certain new and useful Improvements in Caster Sockets, of which the following is a specification.

My invention relates to improvements in caster sockets, and has particular application to that type of caster used on certain kinds of furniture in which the spindle which carries the roller is capable of withdrawal from its socket.

The principal objects of the invention are to provide a socket body which shall be of stronger and more rigid construction than heretofore has been the case with such sockets; to provide an improved form of socket body which may be cheaply and economically constructed from sheet metal by ordinary stamping operations; and, in general, to provide an improved caster socket body of the character referred to.

In the drawings, which show an improved caster socket as used in connection with a metal bed caster—

Fig. 1 is an axial or vertical section taken through the post and caster;

Fig. 2 is a side elevation of the socket before the insertion of the post;

Fig. 3 is an end elevation of the socket shown in Fig. 2;

Fig. 4 is a section taken on the line 4—4 of Fig. 1; and Fig. 5 is a section taken on the line 5—5 of Fig. 1.

Referring to the drawings, 10 represents the bottom end of the hollow corner post of a bedstead frame, said post being trimmed at the bottom by a suitable bottom mount 11 which is furnished merely for the purpose of ornamentation.

From an inspection of the drawings, it will be recognized that the caster is, in its general construction, somewhat similar to that of a well known type now on the market. In said type of caster, the socket portion is preferably forced into the bottom of the post and held there by friction; the roller spindle and associated parts form a separate unit, and may be shipped separately and thrust into place when the piece of furniture has reached its ultimate location. It may or may not be desirable to assemble the socket in the post prior to shipment of the furniture. It will be understood, however, that if the socket is assembled prior to shipment, the swivel or roller spindle is shipped separately. In the event that the socket is not inserted in the post until after shipment, the entire caster may obviously be assembled complete before shipment and shipped as a complete unit. Whichever method of assembly be adopted, my improved construction will be equally applicable.

My improved caster is equipped with the usual floor roller 12 which is journaled on a pin 13 rigidly secured in the arms or depending legs of a bifurcated bracket member 14. Said bracket member 14 is rigidly united to the lower end of a vertical spindle 15 by any suitable means of attachment, such as riveting 16. Preferably, the lower end of the spindle 15 is enlarged, as shown at 17, to facilitate the attachment of the spindle to the bracket and assist in the riveting operation.

Immediately above the enlargement 17 the spindle 15 is rotatably and slidably supported in an axially vertical position by an internally-projecting annular flange 18 on a plate 19 extending horizontally across the bottom end of the post. Preferably, said plate 19 is made in the form of a disk in order completely to close the bottom end of the post and thereby exclude insects. Said plate 19 also forms a support and connection for the depending legs 20 and 21 of a folded, stamped sheet metal member which constitutes the principal portion of the body of the socket. The remaining part of said socket body is the connection plate 19. Said bifurcated stamping, designated as a whole 22, is constructed from a strip of sheet metal folded mid-length, as shown at 23 and 24, the width of the metal strip at the fold being about two-thirds of the internal diameter of the post 10 for which the caster is designed, and considerably greater than the diameter of the spindle 15.

Centrally of the folding line, the depending legs 20 and 21 of the socket body are stamped out to form the respective halves of a cylindrical minor socket 25 substantially fitting the upper end of the spindle 15, thereby furnishing a bearing for positioning the upper end of the spindle 15 and performing a function similar to that of the lower bearing 18. Preferably, the extreme upper end of the minor socket is punched inwardly and downwardly, as shown at 26, to furnish a small rounded nub which rests upon the upper end of the spindle 15. The end thrust on the spindle 15, due to the imposed weight, is transmitted entirely through the point 26, which is of quite limited area, and hence resistance to the proper swiveling of the spindle is reduced to a minimum.

In order to retain the spindle in the socket, the upper end of the spindle a short distance from the end, is reduced in diameter, as shown at 27. The sides of the minor socket portion 25 are also dented inwardly, as shown at 28, said indentations 28 substantially fitting the reduced diameter portion 27 of the spindle 15. It will be understood that the internal spacing between the two indentations 28 is slightly less than the diameter of the unreduced upper end of the spindle so that the spindle will be retained in the socket. By reason of the resilience of the metal of the socket, it is possible to insert and withdraw the spindle without requiring the application of an inconvenient amount of effort.

The lower ends of the bifurcated stamping 22 are stamped to form portions of a cylinder fitting the interior of the hollow post 10, the fit being rather snug to prevent the socket from dropping out of the post during shipment, and also to prevent looseness or insecurity of the parts. The spacing of the bottom ends of the depending legs 20 and 21 is maintained by interfolding same with the up-turned flange 29 on the plate 19, the upper edge of said plate flange 29 being crimped or spun over the outwardly-extending flanges 30 of the socket legs 20 and 21, as shown.

In practice, the pairs of fins or wings 31 on either side of the minor socket portion 25 are pressed together tightly by a final spanking operation, so that the spacing of the halves of said minor socket portion 25 and also of the upper portions of the main socket portions 20 and 21 are accurately maintained and there is substantially no tendency towards inaccuracy of fit, due to stock or tool variations. Also, it will be observed that, by reason of the contact established between the lower ends of the fins or wings 31, any tendency towards collapsing of the socket is reduced to a minimum. Also, the presence of the fins or wings 31 materially assists in the punch press operations necessary for the stamping out of the socket body.

The scope of my invention should be determined by reference to the appended claims.

I claim as my invention:

1. In combination, a hollow post, a roller, a vertical swivel-spindle extending upwardly into the bottom of the post, a bracket on the lower end of the spindle and on which the roller is pivotally mounted on a horizontal axis offset from the spindle axis, means at the bottom of the post in which the lower end of the spindle is rotatably supported, and a socket body in said post in which the upper end of the spindle can rotate, and supported by the extremity of the spindle, said socket comprising a unitary stamped sheet metal strip folded to provide depending legs widely spaced at their lower ends to fit the interior of the post and contracted portions at their upper ends substantially fitting the upper end of the spindle, and to provide pairs of fins constituting lateral extensions of said contracted leg portions.

2. In combination, a hollow post, a roller, a vertical swivel-spindle extending upwardly into the bottom of the post, a bracket on the lower end of the spindle and on which the roller is pivotally mounted on a horizontal axis offset from the spindle axis, a plate at the bottom of the post in which the lower end of the spindle is rotatably supported and through which the upper end of the spindle may be inserted, and a socket body in said post in which the upper end of the spindle can rotate, and supported by the extremity of the spindle, said socket comprising a unitary stamped sheet metal strip folded midlength to provide depending legs widely spaced at their lower ends to fit the interior of the post, connected by said plate, and contracted portions at their upper ends substantially fitting the upper end of the spindle and to provide pairs of wings symmetrically disposed at opposite sides of the contracted portions and constituting lateral extensions of said contracted leg portions.

3. In combination, a hollow post, a roller, a vertical swivel-spindle extending upwardly into the bottom of the post, a bracket on the lower end of the spindle and on which the roller is pivotally mounted on a horizontal axis offset from the spindle axis, means at the bottom of the post in which the lower end of the spindle is rotatably and slidably supported, and a socket body in said post in which the upper end of the spindle can rotate, and supported by the extremity of the spindle, said socket comprising a unitary stamped sheet metal strip folded to provide depending legs widely spaced at their lower ends to fit the interior of the post, and contracted portions at their upper ends substantially fitting the upper end of the spindle, the width of the strip at the fold being greater than the diameter of said contracted leg portions so as to provide pairs of fins constituting lateral extensions of said contracted leg portions.

4. In combination, a hollow post, a roller, a vertical swivel-spindle extending upwardly into the bottom of the post, a bracket on the lower end of the spindle and on which the roller is pivotally mounted on a horizontal axis offset from the spindle axis, means at the bottom of the post in which the lower end of the spindle is rotatably supported, and a socket body in said post in which the upper end of the spindle can rotate, and supported by the extremity of the spindle, said socket comprising a unitary stamped sheet metal strip folded to provide depending legs widely spaced at their lower ends to fit the interior of the post and contracted portions at their upper ends substantially fitting the upper end of the spindle, the width of the strip at the fold being greater than the diameter of said contracted leg portions, so as to provide pairs of wings straddling the vertical plane in which lies the fold line constituting lateral extensions of said contracted leg portions and connecting the widely-spaced leg-portions with the fold-line.

5. The combination of a hollow post and a caster therefor which includes a spindle and a socket for said spindle, said socket being formed of a single blank of sheet metal folded intermediate its length to form a pair of leg portions spaced and shaped at their lower ends to fit the interior of the post and at their upper ends to fit the spindle and having the spindle-fitting portions extended laterally to constitute a pair of wings straddling the plane of the fold and integrally connected together by the fold.

JOHN F. GAIL.